Patented Feb. 21, 1939

2,148,194

UNITED STATES PATENT OFFICE 2,148,194

PIGMENTS

Julius Drucker, Leverkusen-I. G. Werk, Germany, assignor to I. G. Farbenindustrie Aktiengesellshaft, Frankfort-on-the-Main, Germany No Drawing. Application March 18, 1936, Serial No. 69,587. In Germany October 14, 1933

7 Claims. (Cl. 134—58)

This invention relates to a process for the manufacture of cadmium sulfide or -selenide pigments, or pigments of mixtures of these compounds. The process consists in that the crude pigments prepared in the known manner are heated with liquid water which contains an alkaline reacting substance, such as alkali metal hydroxides, -carbonates, -sulfides or alkaline-earth metal oxides, hydroxides or sulfides, eventually in the presence of neutral alkali metal salts, such as alkali metal chlorides and sulfates, to temperatures above 100° C. under pressures exceeding one atmosphere.

These cadmium sulfide or -selenide pigments hitherto have been prepared by reacting upon aqueous solutions of cadmium salts, such as cadmium chloride or cadmium sulfate, or aqueous suspensions of cadmium hydroxide or cadmium carbonate with solutions of sodium sulfide or of selenium in sodium sulfide respectively. The compounds obtained, the so-called crude pigments, consisting of cadmium sulfide or cadmium selenide or of mixtures thereof were washed, dried and calcined at about 400–800° C.

It is known that the usually applied calcination in the manufacture of pigments from crude pigments which are obtained by double decomposition of the starting material in aqueous solution at a temperature below 100° C., may be replaced by effecting the double decomposition at an elevated temperature under pressure, or by heating the crude pigments obtained at a temperature of below 100° C. with water under pressure. If the said process is carried out at temperatures between 250–370° C. in some cases pigments of good covering power and tinting strength are obtained.

When preparing cadmium sulfide or -selenide pigments in accordance with this process only pigments of inferior coloring power and faded shades are obtained if the heating under pressure is effected in pure water.

In accordance with the present invention pigments of good coloring power and tinting strength and beautiful bright red shades are obtained by effecting the heating under pressure of the pigment with water in the presence of a small quantity of an inorganic compound reacting alkaline in aqueous solution, such as alkali-metal hydroxides, -carbonates or -sulfides, or alkaline-earth metal oxides, hydroxides or sulfides, and, if desired in the presence of neutral salts, such as alkali metal chlorides or sulfates, and at a temperature of 300–370° C. These alkaline reacting inorganic compounds must be present during the treatment in about 0.05 to about 10% of the liquid. The neutral salts may be present in quantites ranging from 0.5% to 10%. But also more concentrated solutions can be used, for instance solutions which are saturated with the neutral salt employed. By suitable selection of these additional substances and their concentration respectively, the tint of the pigments can be influenced to a certain extent. The process may also be carried out by heating the crude pigments in the liquid in which they have been prepared, since this liquid generally contains also the said additional substances. However, in that case care is to be taken that the concentration of the additional substances does not exceed the above indicated concentration limits, which can be effected by diluting the solution. Needless to say, that not the whole volume of the liquid need be subjected to the treatment, but part of the liquid may be removed by centrifuging, settling or filtering. Generally it is advantageous to subject to the heating under pressure such crude pigments and suspensions which contain not less than 100, and not more than 500 grams of dry pigment in one liter.

The invention is further illustrated by the following example:—

Example.—173 grams of freshly precipitated cadmium carbonate are reacted with 600 ccs. of a 15% $Na_2S$ solution in which 21 grams of selenium are dissolved. The crude pigment precipitating is washed out. On suspending the crude pigment in clear water and heating the suspension for 40 minutes to 360° C. under pressure a pigment of a dull blue tint and only slight tinting strength is obtained. However, when performing heating under pressure in a 3% sodium sulfide solution a pigment of bright yellow-red tint and high coloring power is obtained, whereas by the addition of a small quantity of sodium carbonate to the sodium sulfide solution a pigment of a bright bluish-red tint is obtained.

This is a continuation in part of the copending application Serial No. 746,927, filed October 4, 1934.

I claim:—

1. In the process of preparing a pigment of the group consisting of cadmium sulfide, cadmium selenide and mixtures thereof, the step which comprises heating the crude pigment to a temperature of between about 300 and about 370° C. with liquid water and 0.05 to 10% of an inorganic compound reacting alkaline in an aqueous medium.

2. In the process of preparing a pigment of the group consisting of cadmium sulfide, cadmium selenide and mixtures thereof, the step which comprises heating the crude pigment to a temperature of between about 300 and about 370° C. with liquid water and 0.05 to 10% of an alkaline reacting compound selected from the group consisting of alkali-metal hydroxide, alkali-metal carbonate, alkali-metal sulfide, alkaline-earth metal oxide, hydroxide and sulfide.

3. In the process of preparing a pigment selected from the group consisting of cadmium sulfide, cadmium selenide and mixtures thereof, the step which comprises heating the crude pigment to a temperature of between about 300 and about 370° C. with liquid water, 0.05 to 10% of an inorganic compound reacting alkaline in an aqueous medium and an inorganic salt in an amount sufficient to produce the desired tint selected from the group consisting of alkali metal chloride and sulfate.

4. In the process of preparing a pigment selected from the group consisting of cadmium sulfide, cadmium selenide and mixtures thereof, the step which comprises heating the crude pigment to a temperature of between about 300 and about 370° C. with liquid water, 0.05 to 10% of an alkaline reacting compound selected from the group consisting of alkali-metal hydroxide, alkali-metal carbonate, alkali-metal sulfide, alkaline-earth metal oxide, hydroxide and sulfide and an inorganic salt selected from the group consisting of alkali-metal chloride and sulfate in an amount sufficient to produce the desired tint.

5. In the process of preparing a pigment selected from the group consisting of cadmium sulfide, cadmium selenide and mixtures thereof, the step which comprises heating the crude pigment to a temperature of between about 300 and about 370° C. with liquid water and 0.05 to 10% of an inorganic compound reacting alkaline in an aqueous solution, and a 0.5% to saturated solution of an inorganic salt selected from the group consisting of alkali-metal chloride and sulfate in an amount sufficient to produce the desired tint.

6. In the process of preparing a pigment selected from the group consisting of cadmium sulfide, cadmium selenide and mixtures thereof, the step which comprises heating the crude pigment to a temperature of between about 300 and about 370° C. with liquid water containing about 3% of sodium sulfide.

7. In the process of preparing a pigment selected from the group consisting of cadmium sulfide, cadmium selenide and mixtures thereof, the step which comprises heating the crude pigment to a temperature of between about 300 and about 370° C. with liquid water containing about 3% of sodium sulfide and a small quantity of sodium carbonate.

JULIUS DRUCKER.